United States Patent [19]

Ensor et al.

[11] 3,839,300

[45] Oct. 1, 1974

[54] AROMATIC RESINS

[75] Inventors: Gordon R. Ensor, Llangollen; Peter E. Golbert, Wrexham, both of Wales

[73] Assignee: Monsanto Chemicals Limited, London, England

[22] Filed: Feb. 8, 1973

[21] Appl. No.: 330,555

[30] Foreign Application Priority Data
Feb. 16, 1972   Great Britain ..................... 7235/72

[52] U.S. Cl. ...... 260/78.4 N, 117/161 UA, 161/170, 161/205, 260/2 R, 260/29.1 R, 260/34.2, 260/37 N, 260/37 NP, 260/46.5 R, 260/46.5 Y, 260/47 CZ, 260/49, 260/79, 260/79.3 M, 260/79.3 R

[51] Int. Cl. ............................................. C08g 33/00

[58] Field of Search ............. 260/2 R, 78.4 N, 47 R, 260/47 C, 47 CZ, 46.5 R, 46.5 Y, 49, 29.1 R, 34.2, 37 R, 37 N; 117/161 UA; 161/170

[56] References Cited
UNITED STATES PATENTS

| 3,320,183 | 5/1967 | Brown | 260/2 |
| 3,444,144 | 5/1969 | Neale | 260/78.4 |
| 3,585,163 | 6/1971 | Neale et al. | 260/47 |
| 3,654,192 | 4/1972 | Vogel | 260/2 R |

*Primary Examiner*—Joseph L. Schofer
*Assistant Examiner*—J. Kight
*Attorney, Agent, or Firm*—R. Bruce Blance; Edward P. Gratton; James C. Logomasini

[57] ABSTRACT

Aromatic polymers of relatively low degree of polymerization which can be converted to crosslinked polymers having high thermal stability. The polymers are prepared by reaction of an aromatic nitrile component and an aromatic sulphonyl halide. Cross-linking is effected without the production of volatile by-products which can lead to blistering in composites and non-uniformities in surface coatings.

19 Claims, No Drawings

AROMATIC RESINS

BACKGROUND OF THE INVENTION

1. Field of the Invention

This invention relates to polymeric materials having a relatively low degree of polymerization and which can be converted to crosslinked polymers having high thermal stability.

2. The Prior Art

In modern technology there is a demand for resins having high resistance to thermal and oxidative deterioration and which can function as, for example, matrix resins in the production of fiber-reinforced resin articles having high mechanical strengths or as the resin component in filled or unfilled coating compositions.

Of the known resins having high oxidative and thermal stability, many are characterized by a molecular structure wherein aromatic nuclei are linked together directly or through stable atoms or groups such as oxygen atoms or sulphone or carbonyl groups. One technique of utilizing certain such resins involves forming a mixture of a resin having the above characteristic aromatic structure and a degree of polymerization such that the resin is soluble in organic solvents — a so-called prepolymer — and a crosslinking agent. This mixture, usually as a solution in an organic solvent, is then used to impregnate fibrous reinforcing material if a fiber-reinforced article is required, or directly or after the incorporation of a filler, as a coating composition on an article to be coated. After evaporation of the solvent, the impregnated material or the coated article is then heated to crosslink the prepolymer, so that the final resin, in respect of solubility and fusibility shows typical thermoset resin properties.

As crosslinking agents for aromatic resins, it has been proposed to use aromatic sulphonyl halides, xylylene halides and xylylene glycols. All these agents suffer from the disadvantage that the crosslinking reaction is accompanied by the formation of gaseous by-products, sulphur dioxide and a hydrogen halide being produced from an aromatic sulphonyl halide, a hydrogen halide from a xylylene halide, and water vapor from xylylene glycol. This can lead to blistering in the production of fiber-reinforced articles and non-uniformities in surface coatings.

Thus, there exists in the art a need for aromatic prepolymers which undergo self-crosslinking on heating without the production of by-products giving rise to the defects noted above.

SUMMARY OF THE INVENTION

The above-mentioned need in the prior art is fulfilled by the present invention which provides fusible prepolymers having a molecular structure comprising a plurality of aromatic nuclei each linked to an adjacent nucleus directly or through an oxygen, sulphur, carbon or silicone atome, at least some of the nuclei being linked directly, and nitrile groups as nuclear substituents. The nitrile groups allow the prepolymer to undergo self-crosslinking without evolution of volatile products.

The prepolymers melt or soften without significant decomposition, and are further characterized by being soluble in a variety of common organic solvents, in particular by having a solubility of at least 10 grams and usually at least 40 grams per 100 cc. of chloroform at 20°C. In any given prepolymer there is generally a mixture of molecular species which differ in respect of molecular weight, and by isomerism, for example in the degree of branching in the molecular structure. The preferred prepolymers of the invention are those having number average molecular weights in the range 500 to 4,000, with not more than 10 per cent of the material having a molecular weight less than 500, and not more than 10 per cent having a molecular weight in excess of 10,000. Where the aromatic nuclei of the prepolymer are benzene nuclei, the linkages in a succession of such nuclei are preferably ortho- or (more preferably) meta-, rather than para.

Where linkage of two aromatic nuclei occurs through a sulphur atom, the linkage can be a sulphide or sulphone linkage; where linkage occurs via a carbon atom, this can be part of an alkylene, e.g. methylene, or alkylidene group but is preferably the carbon atoms of a carbonyl group; and where linkage occurs via a silicon atom, the compound is generally one in which the silicon atom is a member of a siloxane chain or ring.

The average number of nitrile groups present is at least one per molecule, and is generally from 1 to 5, preferably from 1 to 3, per 500 units of molecular weight.

The invention includes a method for the preparation of the prepolymers of the invention, which comprises reacting an aromatic sulphonyl halide containing at least two sulphonyl halide groups each linked to a nuclear carbon atom, with an aromatic component by heating under such conditions that sulphur dioxide and a hydrogen halide are evolved, the aromatic component being an aromatic nitrile or a mixture of an aromatic nitrile and one or more other aromatic compounds, both the aromatic nitrile and any other aromatic compound having replaceable nuclear hydrogen atoms but being otherwise inert under the reaction conditions, and the number of moles of the aromatic component reacted per mole of aromatic sulphonyl halide being not more than the number of sulphonyl halide groups in the molecule of the aromatic sulphonyl halide.

DETAILED DESCRIPTION

In the present invention, a temperature of not less than about 200°C. is generally required for a practical reaction rate in the process, and preferred temperatures are generally in the range 275° to 400°C., more especially in the range 290° to 330°C.

The range of aromatic sulphonyl halides that can be used in this process is generally the same as that disclosed in U.S. Pat. No. 3,585,163, issued to A. J. Neale and T. J. Rawlings. Preferred aromatic sulphonyl halides are benzene sulphonyl halides, for example, benzene-1, 3-disulphonyl chloride and benzene-1,3,5-trisulphonyl chloride. Others that can be used include compounds that contain two or more aromatic nuclei, for example, benzene nuclei, linked to each other directly or through an atom or group as specified above with reference to the molecular structure of the prepolymer. Typical examples are biphenyl-3,3'-disulphonyl chloride, diphenyl ether-4,4'-disulphonyl chloride, and diphenyl sulphone-4,4'-disulphonyl chloride. The aromatic nucleus or nuclei of the aromatic sulphonyl halide should contain no substituents that are reactive under the process conditions, other than the sulphonyl halide groups. Preferably, no other substituents are present, but inert substituents such as halogens may be present. The aromatic sulphonyl halides used in the process are preferably sulphonyl chlorides or sulphonyl bromides.

The aromatic nitrile can be a compound containing one or more aromatic nuclei, for example, benzene or naphthalene nuclei, and where it contains more than one nucleus, the nuclei are linked to each other directly or via atoms or groups as specified above with reference to the molecular structure of the prepolymer. The aromatic nitrile can contain one or more nitrile groups, and in compounds having more than one nucleus and more than one nitrile group, the nitrile groups may be attached to one nucleus or to different nuclei. For convenience of operation, more specifically to avoid having to operate the process under pressure, the aromatic nitrile is preferably one having a normal boiling point within, or not appreciably below, the chosen reaction temperature. Benzonitrile can be used, but for the foregoing reason is less suitable than, for example, the phthalonitriles (ortho-, meta- or para). The preferred nitriles are phthalonitrile and terphthalonitrile. Others that can be used include alpha- and beta- naphthonitrile, naphthalonitriles, biphenyl-4,4'-dinitrile and diphenyl ether-3,3' dinitrile.

The aromatic nitrile preferably contains no nuclear substituents in addition to the nitrile group or groups, and must be free from substituent groups capable of reacting with a sulphonyl halide group. Provided replaceable nuclear hydrogen atoms are present in the aromatic nitrile, however, the nitrile may have additional inert nuclear substituents such as halogen atoms, e.g. chlorine or fluorine, but preferably the nitrile contains at least one nuclear hydrogen atom for every two nuclear carbon atoms.

Where the aromatic component used in the process of the invention is a mixture of an aromatic nitrile and another aromatic compound, the aromatic compound can be any of those indicated as suitable for use in the process of U.S. Pat. No. 3,585,163. The preferred compounds are biphenyl and polyphenyls, for instance terphenyls, quarterphenyls, sexiphenyls, and higher polyphenyls containing up to 20 benzene nuclei. The commercially available polyphenyls are isomeric mixtures, and such mixtures are suitable for use in the process. Polyphenyls having a predominance of ortho and meta linkages are preferred to para polyphenyls. Examples of other aromatic compounds which can be used are aryl ethers and polyaryl ethers for instance diphenoxybiphenyls, diphenoxydiphenyl ethers; aryl sulphides and polyaryl sulphides for instance bis(phenylthio) biphenyl sulphides; and aryl sulphones and polyaryl polysulphones. The aromatic compound preferably contains no nuclear substituents, and must be free from substituent groups capable of reacting with a sulphonyl halide group. Provided replaceable hydrogen atoms are present, however, the compound may contain inert nuclear substituents such as halogen atoms, e.g. chlorine or fluorine. Preferably the compound contains at least one nuclear hydrogen atom for every two nuclear carbon atoms.

As indicated above, the number of moles of the aromatic component reacted per mole of aromatic sulphonyl halide is not more than the number of sulphonyl halide groups in the sulphonyl halide molecule. It is possible, but not preferable, for the aromatic sulphonyl halide to be heated with an excess of the aromatic component, provided reaction conditions are such that the excess of aromatic component is present as such in the product after all the aromatic sulphonyl halide has reacted. Preferably, the molar ratio of aromatic sulphonyl halide to aromatic component should not exceed 1:1, since with larger amounts of sulphonyl halide, the degree of crosslinking in the polymer, and hence the proportion of insoluble material, increases. Using an aromatic sulphonyl halide containing two sulphonyl halide groups per molecule, the molar ratio of aromatic sulphonyl halide to aromatic component is preferably in the range 0.5:1 to 0.95:1. Where the aromatic sulphonyl halide contains more than two sulphonyl halide groups, the preferred upper limit for the range of molar ratios is less than 0.95:1, while the lower limit is $1/n$ where n is the number of sulphonyl halide groups in the aromatic sulphonyl halide molecule.

In instances where the aromatic component is a mixture of an aromatic nitrile and one or more other aromatic compounds, the molar ratio of the constituents of the mixture is selected according to the required nitrile content of the product, and will depend on such factors as the number of nitrile groups in the aromatic nitrile molecule, and the relative molecular weights of the aromatic nitrile and the other aromatic compound or compounds. A preferred type of prepolymer is produced by the reaction of benzene-1,3-disulphonyl chloride with a mixture of a phthalonitrile and terphenyl. The ratio of the number of moles of benzene-1,3-disulphonyl chloride to the number of moles of phthalonitrile plus the number of moles of terphenyl is preferably from 0.75:1 to 0.95:1, and the molar ratio of phthalonitrile to terphenyl is preferably from 3:1 to 1:3.

The manner of mixing the reactants is not critical, and the total quantities to be used may be mixed together at the beginning of the process. A preferred method, however, is to add the aromatic sulphonyl halide gradually to the aromatic component maintained at the reaction temperature. As a further preferred feature, the reaction is carried out in a non-oxidizing atmosphere. This can be achieved by passing a stream of inert gas, for example, nitrogen, through the vessel in which the reaction is carried out. Operating in this manner has the advantage that the gaseous by-products of the reaction, sulphur dioxide and a hydrogen halide, are carried out in the effluent gas stream, and the amounts priduced can readily be determined, thereby enabling the course of the reaction to be followed.

Certain substances, in particular metals and metal compounds, have a catalytic effect on the reaction, and may be added with a view to increasing the reaction rate and/or reducing the reaction temperature. Copper and copper compounds, for example, copper halides, are among the most effective catalysts.

An alternative method for the production of the prepolymers of the invention comprises the reaction of an aromatic component as defined above with a relatively large amount of an aromatic monosulphonyl halide, generally at least two, for example, from 2 to 10, moles per mole of the aromatic component.

Reaction conditions for this process are generally similar to those for the process employing an aromatic polysulphonyl halide as described above. Thus, the reaction temperature is preferably in the range 275° to 325°C., and in the preferred manner of operating, the aromatic monosulphonyl halide is added gradually during the course of the reaction to the aromatic component maintained at the reaction temperature in an inert atmosphere.

Aromatic nitriles and other aromatic compounds comprising the aromatic component can be selected from the types and examples of such materials described above. Suitable aromatic sulphonyl halides, each of which has a single sulphonyl halide group attached to a nuclear carbon atom, include benzenesulphonyl chloride, benzenesulphonyl bromide, 2-, 3- and 4-phenylbenzenesulphonyl chlorides and p-toluenesulphonyl chloride. The preferred sulphonyl halides are the sulphonyl chlorides and sulphonyl bromides. A catalyst can be used if desired, as in the above-described process.

The usual procedure for the production of a reinforced composite comprises impregnating a mat, web, or other shaped body or reinforcing material with a solution of the prepolymer in a solvent. Suitable fibrous reinforcing materials include glass and carbon fibers and asbestos. The solvent is then evaporated and the composite subjected to an elevated temperature at which crosslinking of the prepolymer occurs, optionally under pressure. Where a higher ratio of matrix polymer to reinforcing agent is required than can be achieved by simple impregnation of the reinforcing agent, a mixture of prepolymer and reinforcing agent can be heated in a mold. Particulate fillers as well as fibrous materials can be employed in the production of composites having a matrix derived from a prepolymer of the invention.

A coating composition of the invention comprises a mixture of a prepolymer of the invention, an inorganic pigment, and optionally a volatilizable solvent for the prepolymer. The weight ratio of pigment to prepolymer is usually within the range 3:1 to 1:3.

The inorganic pigment is selected for qualities of, for example, color, reflectance and hiding power. It may, for instance, be titanium dioxide, zinc oxide, antimony oxide, silicon carbide, carbon black or chrome yellow. Non-oxidizing pigments are preferred for high temperature stability of the coating. For high light- and heat-reflectance, the rutile form of titanium dioxide is preferred.

Examples of suitable volatilizable solvents are chloroform, benzene, chlorobenzene, toluene, and xylene. Drying of a solvent-containing composition upon the substrate to leave a layer on the surface of the substrate may be done with or without heating, depending upon the ease of volatilization of the solvent. Air-drying at room temperature may be employed, particularly when evaporation of the solvent requires little, if any, application of heat.

The coating need not be applied together with a volatilizable solvent. Thus, a powdered mixture comprising the prepolymer and the inorganic pigment may be applied to a substrate. When it is heated, the mixture first melts, and finally sets to an infusible heat-resistant coating. The powdered mixture may also be used for providing a coating on a substrate by the fluidized bed process. As still a further modification, the mixture may be heated to melt the prepolymer, e.g. at from 100° to 250°C., and thereafter applied to the substrate by brushing, spraying or dipping.

The curing step may be conducted either in an inert atmosphere which may be, e.g. nitrogen, argon or carbon dioxide, or in vacuum, or in air. Advantageously several coatings are applied to the substrate, allowing evaporation of any solvent present to occur, and possibly effecting partial curing, between coatings.

The final layer of filled prepolymer can be cured by subjecting the coated substrate to a temperature of from 250°C. to 500°C., preferably from 300° to 400°C. The duration of heating required is inversely related to the temperature, but will generally be at least 1 hour at 500°C. and up to 50 hours or more at temperatures of 300°C. or below.

The cured coatings are light-colored in appearance when a white pigment is used, firmly adherent to the solid substrate, and relatively non-porous and free from defects. Accordingly, the present coating method and the coated substrate provided thereby are eminently suited for space applications wherein long exposure to high temperatures is encountered. The tightly bonded coating is hard and smooth and remains so in spite of such exposure. The coating, when applied to the surface of a metal object, is an admirable dissipater of light and heat, and is useful for thermal control. Because of the integrity of the coating and its oxidative stability, it is useful for protection of oxidizable substrates against oxidation, as, for example, ferrous alloys, copper, graphite, etc. The coating also affords corrosion resistance.

Although these coatings are particularly useful on metal substrates, they may also be applied to reinforced composites, e.g. laminates containing inorganic fibrous reinforcing materials, to provide useful protective or decorative coatings.

The invention is illustrated by the following Examples. Unless otherwise indicated, all parts and percentages given are by weight.

Example 1

46 Parts by weight of a mixture of isomeric terphenyls and 25.6 parts by weight of phthalonitrile are melted together in a reaction vessel equipped with a stirrer, reflux condenser, heated container and gas inlet tube. The temperature of the mixture is raised to 300°C. and a slow stream of nitrogen is passed into the vessel. 50 Parts by weight of molten benzene-$m$-disulphonyl chloride are added slowly to the stirred contents of the vessel over a period of 5 hours while the temperature is maintained at 300°–315°C. The effluent nitrogen stream, containing sulphur dioxide and hydrogen chloride produced during the reaction, is taken from the top of the reflux condenser through scrubbers containing sodium hydroxide solution.

The mixture is stirred for ½ hour at 300–310°C. after the addition of the benzene-$m$-disulphonyl chloride is complete. Analysis of the scrubber solution showed that 92 per cent of the theoretical amount of sulphur dioxide and 92.3 per cent of the theoretical amount of hydrogen chloride is evolved during the reaction. Unreacted terphenyl and phthalonitrile are then removed by distillation to a pot temperature of 300° C. at 7 mm mercury pressure. The weight of the residual product is 65 parts by weight.

The product (prepolymer) is soluble in chloroform (solubility greater than 50 grams per 100 ml of chloroform at 20°C.) and is completely molten at 200°C. Its number average molecular weight is 1035 and it contains by weight 88.2 per cent carbon, 4.65 per cent hydrogen, 4.95 per cent nitrogen, 0.7 per cent sulphur and 1.27 per cent chloride. Assuming that all the nitrogen is present as nitrile, this nitrogen content corresponds to an average of 3.67 nitrile groups per polymer molecule. The molecular weight corresponds to an average of 12.5 benzene nuclei per molecule. On heating for 42 hours at 350°C., the prepolymer loses 16.2 per cent of its weight and is converted to a material of which only 6 per cent by weight is soluble on continuous (Soxhlet) extraction with chloroform.

EXAMPLE 2

A coating of a suspension prepared by dispersing 5 parts by weight of flour grade silicon carbide in a solution of 5 parts of the prepolymer of Example 1 in 20 ml of chlorobenzene is applied by brush to a clean mild steel plate. A second coating is applied after drying the first for 30 minutes at 80°C. A third coat is applied similarly, and after drying for 30 minutes at 80°C., the coatings are cured by heating at 350°C. for 20 hours. At the end of this time, the coating is hard, completely insoluble in chloroform, and without visible blisters or pin holes.

EXAMPLE 3

The reaction product of Example 1 is dissolved in chloroform and the solution is used to impregnate a 12 inch by 12 inch asbestos felt mat. the chloroform is allowed to evaporate and the mat is cut into strips 4 inches by 3 inches. Six such strips are placed one on top of another in a press at 350°C. and are allowed to heat up for 10 minutes before a pressure of 450 p.s.i. (gauge) is applied. The pressure is temporarily released after 20 minutes to allow gas to escape and is then reapplied for four hours and 40 minutes. The laminate which is post-cured by storage in an oven for two days at 240°C. has a high flexural strength.

EXAMPLE 4

34 Parts by weight of diphenyl ether and 25.6 parts by weight of terephthalonitrile are melted together in a reaction vessel equipped with a stirrer, reflux condenser, heated tank and gas inlet tube. The temperature of the mixture is raised to 300°C. and a slow stream of nitrogen is passed into the vessel. 73 Parts by weight of molten diphenyl ether-4,4'-disulphonyl chloride are added slowly from the heated tank to the stirred contents of the vessel over a period of 5 hours while the temperature is maintained at 300–315°C. The effluent nitrogen stream, containing sulphur dioxide and hydrogen chloride produced during the reaction, is taken from the top of the reflux condenser through scrubbers containing sodium hydroxide solution.

The mixture is stirred for one-half hour at 300–310°C. after the addition of the diphenyl ether-4,4'-disulphonyl chloride is complete. Analysis of the scrubber solution showed that more than 90 per cent of the theoretical amount of sulphur dioxide and more than 90 per cent of the theoretical amount of hydrogen chloride is evolved during the reaction. Unreacted diphenyl ether and terephthalonitrile are then removed by distillation to a pot temperature of 300°C. at 7 mm mercury pressure. The weight of the residual product is 85 parts by weight.

The product (prepolymer) is soluble in chloroform and is completely molten at 200°C. Its number average molecular weight is approximately 1,400. On heating for 42 hours at 350°C., the prepolymer is converted to a material which is almost completely insoluble in chloroform. A solution of 5 grams of prepolymer in 20 ml of chlorobenzene is applied to a clean mild steel plate. After drying for 30 minutes at 80°C., a 1 mil thick coating is obtained. The coating is heated at 350°C. for 20 hours. At the end of this time, the coating is hard, insoluble in chloroform and free of defects.

EXAMPLE 5

204 Parts by weight of biphenyl-4,4'-dinitrile are melted in a reaction vessel equipped with a stirrer, reflux condenser, heated tank and gas inlet tube. the temperature of the dinitrile is raised to 300°C. and a slow stream of nitrogen is passed into the vessel. 1,710 Parts by weight of benzenesulphonyl chloride are added to the stirred contents of the vessel over a period of 2 hours. The evolved gases are swept out of the reaction vessel with nitrogen and through a scrubber containing sodium hydroxide solution. Analysis of the scrubber solution indicates that approximately 90 per cent of the theoretical amount of sulphur dioxide and hydrogen chloride is evolved.

The product is poured into a pan to cool. There is recovered 1,700 parts by weight of polymer. The polymer is soluble in chloroform and is completely molten at 200°C. Its number average molecular weight is approximately 2,000. On heating for 40 hours at 350°C., the polymer is converted to a material which is almost completely insoluble in chloroform. A solution of 5 grams of polymer in 20 ml chlorobenzene is applied to a clean mild steel panel and dried for 30 minutes at 80°C. to give a 1 mil dried film. The coating is heated at 350° for 20 hours. At the end of this time, the coating is hard, insoluble in chloroform, and free of defects.

What is claimed is:

1. A fusible polymer having a molecular structure comprising a plurality of aromatic nuclei each linked to an adjacent nucleus directly or through an oxygen, sulphur, carbon or silicon atom. at least some of the nuclei being linked directly; having a number average molecular weight in the range 500 to 4,000 with not more than 10 percent by weight of the material having a molecular weight less than 500, and not more than 10 percent by weight of the material having a molecular weight in excess of 10,000; having 1 to 3 nitrile groups per 500 units of molecular weight as nuclear substituents; and having a solubility of at least 10 grams per 100 cc. of chloroform at 20°C., wherein the fusible polymer is the product of an aromatic component and aromatic sulphonyl halide reacted at a temperature in the range of 275°–400°C. until evolution of sulphur dioxide and hydrogen halide is at least 90 per cent complete; wherein the aromatic component comprises an unsubstituted aromatic nitrile or halogen substituted aromatic nitrile having at least one nuclear hydrogen atom for every two nuclear carbon atoms and optionally an aromatic compound selected from the group consisting of biphenyl, polyphenyls, aryl ethers, polyaryl polyethers, aryl sulphides, polyaryl polysulphides, aryl sulphones, polyaryl polysulphones, and the nuclear-substituted halogen derivatives thereof, provided the compound contains at least one nuclear hydrogen atom for every two nuclear carbon atoms; wherein the aromatic sulphonyl halide contains at least two sulphonyl halide groups each linked to a nuclear carbon atom; and wherein the mole ratio of the aromatic component to the aromatic sulphonyl halide is not greater than the number of sulphonyl halide groups in the molecule of aromatic sulphonyl halide and is not less than 1:1.

2. The fusible polymer according to claim 1 in which the aromatic nitrile is phthalonitrile or terephthalonitrile.

3. The fusible polymer according to claim 1 in which the aromatic component is a mixture of an aromatic nitrile and a mixture of isomeric terphenyls.

4. The fusible polymer according to claim 1 in which the aromatic sulphonyl halide is benzene-1,3-disulphonyl chloride, benzene-1,3-disulphonyl bromide, benzene-1,3,5-trisulphonyl chloride, biphenyl-3,3'-disulphonyl chloride or diphenyl ether-4,4'-disulphonyl chloride.

5. The fusible polymer according to claim 1 in which the aromatic sulphonyl halide contains two sulphonyl halide groups per molecule and the molar ratio of aromatic sulphonyl halide to aromatic component is in the range 0.5:1 to 0.95:1.

6. A fusible polymer having a molecular structure comprising a plurality of aromatic nuclei each linked to an adjacent nucleus directly or through an oxygen, sulphur, carbon or silicon atom, at least some of the nuclei being linked directly; having a number average molecular weight in the range 500 to 4,000 with not more than 10 per cent by weight of the material having a molecular weight less than 500, and not more than 10 per cent by weight of the material having a molecular weight in excess of 10,000; having 1 to 3 nitrile groups per 500 units of molecular weight as nuclear substituents; and having a solubility of at least 10 grams per 100 cc. of chloroform at 20°C., wherein the fusible polymer is the product of an aromatic component and an aromatic sulphonyl halide reacted at a temperature in the range of 275°–400°C. until evolution of sulphur dioxide and hydrogen halide is at least 90 per cent complete; wherein the aromatic component comprises an aromatic nitrile selected from the group consisting of phthalonitrile and terephthalonitrile and optionally an aromatic compound selected from the group consisting of biphenyl, polyphenyls, aryl ethers, polyaryl polyethers, aryl sulphides, polyaryl polysulphides, aryl sulphones, polyaryl polysulphones, and the nuclear-substituted halogen derivatives thereof, provided the compound contains at least one nuclear hydrogen atom for every two nuclear carbon atoms; wherein the aromatic sulphonyl halide is selected from the group consisting of benzene-1,3-disulphonyl chloride, benzene-1,3-disulphonyl bromide, biphenyl-3,3'-disulphonyl chloride and diphenylether-4,4'-disulphonyl chloride; and wherein the molar ratio of aromatic sulphonyl halide to aromatic component is in the range 0.5:1 to 0.95:1.

7. A fusible polymer having a molecular structure comprising a plurality of aromatic nuclei each linked to an adjacent nucleus directly or through an oxygen, sulphur, carbon or silicon atom, at least some of the nuclei being linked directly; having a number average molecular weight in the range 500 to 4,000 with not more than 10 per cent by weight of the material having a molecular weight less than 500, and not more than 10 per cent by weight of the material having a molecular weight in excess of 10,000; having 1 to 3 nitrile groups per 500 units of molecular weight as nuclear substituents; and having a solubility of at least 10 grams per 100 cc. of chloroform at 20°C., wherein the fusible polymer is the product of an aromatic component and benzene sulphonyl chloride reacted at a temperature in the range of 275°–400°C. until evolution of sulphur dioxide and hydrogen halide is at least 90 per cent complete; wherein the aromatic component comprises phthalonitrile and optionally biphenyl or a polyphenyl; and wherein the molar ratio of benzene-sulphonyl halide to aromatic component is in the range 2:1 to 10:1.

8. A process for the production of a fusible polymer having a molecular structure comprising a plurality of aromatic nuclei each linked to an adjacent nucleus directly or through an oxygen, sulphur, carbon or silicon atom, at least some of the nuclei being linked directly, having nitrile groups as nuclear substituents, and having a solubility of at least 10 grams per 100 cc. of chloroform at 20°C., which comprises reacting an aromatic component and an aromatic sulphonyl halide at a temperature in the range of 275°–400°C. until evolution of sulphur dioxide and hydrogen halide is at least 90 per cent complete; wherein the aromatic component comprises an unsubstituted aromatic nitrile or halogen substituted aromatic nitrile having at least one nuclear hydrogen atom for every two nuclear carbon atoms and optionally an aromatic compound selected from the group consisting of biphenyl, polyphenyls, aryl ethers, polyaryl polyethers, aryl sulphides, polyaryl polysulphides, aryl sulphones, polyaryl polysulphones, and the nuclear-substituted halogen derivatives thereof, provided the compound contains at least one nuclear hydrogen atom for every two nuclear carbon atoms; wherein the aromatic sulphonyl halide contains sulphonyl halide groups linked to a nuclear carbon atom; wherein the mole ratio of the aromatic component to the aromatic sulphonyl halide is not greater than the number of sulphonyl halide groups per molecule of aromatic sulphonyl halide and is not less than 1:1 when the aromatic sulphonyl halide contains at least two sulphonyl halide groups per molecule and wherein the mole ratio of the aromatic component to the aromatic sulphonyl halide is at least 2 when the aromatic sulphonyl halide contains one sulphonyl halide group per molecule.

9. A process according to claim 8 in which the aromatic sulphonyl chloride is added gradually to the aromatic component maintained at the reaction temperature.

10. A process for thermosetting the fusible polymer of claim 1 which comprises heating the fusible polymer at a temperature in the range 300° to 400°C.

11. The thermoset product of the fusible polymer of claim 1.

12. A process for the production of a composite comprising a fibrous or particulate filler in a polymer matrix, which comprises heating the fusible polymer of claim 1 in the presence of a reinforcing agent at a temperature at which crosslinking of the polymer occurs.

13. The process according to claim 12 in which heating is effected at 300° to 400°C.

14. A composite comprising a fibrous or particulate filler in a thermoset matrix of the fusible polymer of claim 1.

15. A coating composition comprising the fusible polymer of claim 1 in an organic solvent.

16. The coating composition of claim 15 additionally comprising an inorganic pigment.

17. A substrate coated with the thermoset product of the fusible polymer of claim 1.

18. A fusible polymer having a molecular structure comprising a plurality of aromatic nuclei each linked to an adjacent nulceus directly or through an oxygen, sulphur, carbon or silicon atom, at least some of the nuclei being linked directly; having a number average molecular weight in the range 500 to 4,000 with not more than 10 percent by weight of the material having a molecular weight less than 500, and not more than 10 percent by weight of the material having a molecular weight in excess of 10,000; having 1 to 3 nitrile groups per 500 units of molecular weight as nuclear substituents; and having a solubility of at least 10 grams per 100 cc. of chloroform at 20°C., wherein the fusible polymer is the product of an aromatic component and an aromatic mono-sulphonyl halide reacted at a temperature in the range of 275°–400°C. until evolution of sulphur dioxide and hydrogen halide is at least 90 per cent complete; wherein the aromatic component comprises an unsubstituted aromatic nitrile or halogen substituted aromatic nitrile having at least one nuclear hydrogen atom for every two nuclear carbon atoms and optionally an aromatic compound selected from the group consisting of biphenyl, polyphenyls, aryl ethers, polyaryl polyethers, aryl sulphides, polyaryl polysulphides, aryl sulphones, polyaryl polysulphones, and the nuclear-substituted halogen derivatives thereof, provided the compound contains at least one nuclear hydrogen atom for every two nuclear carbon atoms; and wherein the number of moles of aromatic monosulphonyl halide reacted per mole of aromatic components is between 2 and 10.

19. The fusible polymer according to claim 18 in which the number of moles of aromatic monosulphonyl halide reacted per mole of aromatic component is from 2 to 10.

* * * * *

PO-1050
(5/69)

UNITED STATES PATENT OFFICE
CERTIFICATE OF CORRECTION

Patent No. 3,839,300   Dated   October 1, 1974

Inventor(s) GORDON R. ENSOR and PETER E. GILBERT

It is certified that error appears in the above-identified patent and that said Letters Patent are hereby corrected as shown below:

Cover Page, [75], "Golbert" should read ---Gilbert---.

Signed and sealed this 31st day of December 1974.

(SEAL)
Attest:

McCOY M. GIBSON JR.
Attesting Officer

C. MARSHALL DANN
Commissioner of Patents